Patented June 5, 1928.

1,672,768

UNITED STATES PATENT OFFICE.

ERNEST B. MILLER AND GERALD C. CONNOLLY, OF BALTIMORE, MARYLAND, ASSIGNORS TO THE SILICA GEL CORPORATION, OF BALTIMORE, MARYLAND, A CORPORATION OF MARYLAND.

METHOD OF MAKING GELS.

No Drawing. Application filed May 6, 1927. Serial No. 189,451.

The present invention is directed to a method of making gels.

As a result of the handling and transfer of gels in commercial processes employing the same, some "fines" result. They are also produced in the manufacture of the gels and the special treatments to which they are subjected. "Fines" are the small particles broken off of the larger particles, and have the same characteristics as the larger particles except for differences due merely to size. Although such "fines" are adapted for the same uses as the usual gels, nevertheless they may be so small that difficulties arise because of their minuteness.

Various types of gels can be made on an industrial scale. For example, silica gels may differ by such features as iron content, color, density and other special characteristics. "Fines" of some types of silica gel are readily applicable to certain special or general uses, while "fines" of other types of silica gel do not find ready application in the arts. Although the present invention is directed specifically to giving an economic value to "fines" that do not find ready application in the arts, nevertheless it is applicable generally to substantially all kinds of gel "fines".

The principal object of the invention is to provide a method of converting such "fines" into industrially valuable gels.

Another object of the invention is to provide a method of preparing highly adsorbent gels using as an ingredient a material which would otherwise not be utilized.

Although the invention is applicable to the preparation of highly adsorbent gels in general, it will first be described in connection with the preparation of silica gel.

A method of producing silica gel commercially is described in Patent No. 1,297,724. According to this patented process, solutions of sodium silicate and an acid are mixed with vigorous stirring, the proportions and concentrations of the solutions being of such amounts that a clear solution or "sol" is secured which after a time sets to a homogeneous hydrogel. The concentrations and amounts of the solutions are chosen so that the resulting mixture or "sol" will have an excess acidity within the prescribed limits, the vigorous agitation being for the purpose of always providing acid in excess at all points of the mixture. Such excess acidity, if within the proper limits, has the effect of preventing precipitation in flocks of silica or silicic acid, and causes the silica to remain in solution for a time. The solution of such a silica sol will remain stable for a longer or shorter time, depending on the normality of the free acid therein. When coagulation finally occurs, there is no formation of a flocculent precipitate within the liquid, but on the contrary, the whole body of liquid hardens or sets as a unit into what is known as a hydrogel containing the free acid and the salts present. This hydrogel is broken into pieces, thoroughly washed and then dehydrated to a 10% to 15% water content.

Highly adsorbent silica gels may also be prepared from silica sols in which there is practically no excess acid, that is, the sol may be substantially neutral or even somewhat alkaline. In such cases the ingredients must be vigorously agitated at the time of mixing and preferably a low temperature is employed in order to prevent any substantial precipitation.

The present invention contemplates the intermixture of the gell "fines" with the reaction mass, that is, the sol, which is to coagulate to form the hydrogel. A special method of doing this is to place a portion of the acid solution in a receptacle provided with a high speed stirrer having a speed of, say, five hundred revolutions per minute, start the stirrer and add an aliquot portion of the "fines". After substantially complete distribution of the "fines" in the acid, the corresponding portion of the waterglass solution is added. These steps are repeated until the desired quantities are present. The stirring is best continued throughout until the mixture begins to thicken, whereupon the stirrer is removed and the mass allowed to set. The resulting hydrogel carrying the ingredients resulting from the reaction as well as the incorporated "fines" is then broken into pieces, thoroughly washed, and dehydrated to a 10% to 15% water content, in known ways.

The acid and silicate solutions may be those ordinarily used in the commercial manufacture of highly adsorbent silica gel and of the same strengths and in the same amounts, although these may be varied if desired in the same way that they may be varied in the manufacture of the gel.

A very good product is secured where the "fines" amount to approximately 15% of the silica ($SiO_2$) content of the silicate employed. This amount of "fines" is given merely as an example and does not constitute a limitation of the invention, as it may be substantially increased up to the point where the liquid will no longer suspend the "fines", but some will settle to the bottom of the receptacle. It is obvious that the amount of the "fines" may be decreased almost to zero, for with no "fines" present there remain the well known processes of making the gel. It is possible to produce a useful product by the process of this invention even when the relative amount of "fines" is such that the particles thereof will not be uniformly suspended in the liquid, but some settle to the bottom. Even these particles which settle to the bottom will be cemented together by the hydrogel which is formed in situ. It is preferred, however, as a matter of practice, to have the "fines" present only in such relative amounts that they will be rather uniformly suspended in the acid solution while it is being stirred. It is also preferred as a matter of practice to continue the stirring after complete intermixture of the silicate and acid solutions and the "fines," up to the point where the whole mass begins to thicken. For the reasons above given, this is not necessary, but only preferable.

For example, a final dried product containing about 14% of "fines" calculated on the silica ($SiO_2$) content of the silicate solution used, has the desired degree of hardness, and when powdered, produces substantially the same amount of "fines" as would be secured from the gel made in the usual manner. This product is of the required low density and adsorbs satisfactorily from gases and liquids.

Highly adsorbent gels of materials other than silica, are known, for example, gels of stannic, tungstic, aluminic and titanic oxides. In the preparation of each of these, there is at some step of the process, a fluid reaction mass or sol. Although the invention has been described with specific reference to silica gel, it is applicable to the manufacture of highly adsorbent gels of other materials than silica, whether such gels comprise one material or a mixture of materials. The present invention therefore includes the method of making mixed or compound gels, for particles of one kind of gel may be suspended in the fluid reaction mass or sol, which normally sets to form a hydrogel of another material. This compound hydrogel is washed and dried in the usual manner.

The steps of some specific examples of the complete process are as follows:

*First example.*

1. Take equal volumes of acid and sodium silicate solutions. The sodium silicate solution may have a specific gravity varying from 1.1 to 1.3, but is preferably 1.185. The commercial waterglass usually has about 9% $Na_2O$ and about 29% to 30% $SiO_2$ and is about 42° Bé. This is diluted to 25° to 26° Bé. Where sulphuric acid is employed, it has a specific gravity of 50° to 60° Bé. and is diluted to from 16° to 17° Bé. Expressed in another way, the acid and silicate solutions are of such proportions and concentrations that the excess acid in the sol ranges from substantially 0.0 N. to 0.93 N. and is preferably about 0.5 N.

2. Silica gel "fines" or other gel "fines" in the desired amount, say about 15% of the $SiO_2$ content of the silicate, are taken.

3. The gel "fines" are incorporated in the reaction mixture, or sol, obtained by mixing the acid and silicate solutions with vigorous agitation. Preferably this is done as follows: A portion, say a quarter, of the acid solution is put in a stirring apparatus, and a quarter of the "fines" added thereto. After these "fines" have become thoroughly intermixed with the acid solution, a quarter of the silicate solution is added. The remainder of the ingredients are added quarter by quarter in the same sequence and the agitation continued until the mixture begins to thicken. The mixture is now allowed to set to a hydrogel.

4. The hydrogel is broken into pieces and washed with water.

5. The washed hydrogel is dehydrated to a 10% to 15% water content, as by heating, first at a temperature of about 75° to 120° C., which after a time is slowly increased to 300° to 400° C.

*Second example.*

A gel of titanium oxide with "fines" of a gel of titanium oxide, silica oxide, or other oxides, may be prepared as follows:

1. 50 cc. of titanium tetrachlorid, which is a liquid under normal room conditions of temperature and pressure, is poured over ice until it is diluted to a volume of about 1200 cc. This is then titrated with careful and constant stirring with a twice normal alkali solution, such as sodium hydroxide, to the point of greatest consistency, and at this point the acidity of the mixture or sol is about 0.005 N. This point is easily noted by the use of brom-phenol blue as an indicator.

2. The gel "fines" in the desired amount, say about 15% of the titanium oxide content of the mixture, are stirred into the reaction mixture or sol, or the procedure may be to titrate a portion of the titanium tetrachlorid, a portion of the alkali solution and a portion of the gel "fines", and follow this by adding the remaining mass of the ingredients in the same manner step by step.

3. The mixture sets to a hydrogel, which is broken into pieces and washed by decantation until practically free of chlorides, whereupon it is filtered, as by suction in a thin layer spread over a comparatively large area.

4. The washed hydrogel is dehydrated to a 10% to 15% water content, as by heating, first at a temperature around 100° C. or a little higher, followed by further heating at a temperature of 150° to 200° C. for about two hours.

*Third example.*

A gel of aluminum oxide having gel "fines" of any kind incorporated therein may be prepared as follows:

1. Equal volumes of a solution of aluminum sulphate of the strength of about 5% to 10% and a normal ammonium hydroxide solution are taken and also gel "fines" in the desired amount, say 15% of the aluminum oxide content of the mixture obtained by mixing the aluminum sulphate and ammonium hydroxide solutions.

2. The two solutions and the gel "fines" are intermixed at a low temperature, say about 0° C. Preferably an aliquot portion of each of the ingredients is intermixed first and then the remaining portions added step by step in the same relative amounts, all with vigorous agitation.

3. The mixture is allowed to set to a hydrogel and then washed by decantation to remove any excess of ammonia and ammonium sulphate formed.

4. The washed hydrogel is then dried at about 100° C. or a little higher, and is thereafter subjected to a temperature of 150° to 200° C. for two or three hours to remove the water down to say 10% to 15% of the weight of the dried gel.

*Fourth example.*

A gel of tungsten oxide with gel "fines" of any kind incorporated therein may be prepared as follows:

1. A solution of acid, such as hydrochloric acid or sulphuric acid, is added to a solution of sodium tungstate of about 3% to 8% strength with stirring until a precipitate is formed. This requires only a small amount of acid. The reaction mass is then stirred until this precipitate dissolves, whereupon more acid is added, the total amount of acid used being such as to yield a final acidity of the whole mixture after reaction equal to about one-tenth to five-tenths mols, per liter. This acidity is such that the sol or mixture will set to a hydrogel in from four to thirty minutes, at a room temperature.

2. The desired amount of gel "fines", say about 15% of the tungsten oxide content of the sol or mixture, is added with vigorous stirring to the reaction mixture or sol. If the proportions of the ingredients are such that the sol begins to set before the "fines" can be thoroughly stirred into the mixture, then the ingredients should be mixed at a lower temperature, say 10° to 15° C. The tungstate solution and the acid solution may be mixed together in almost any manner desired, for example, by flowing streams of each into a stirring apparatus, provided that an excess of the tungstate solution over the acid is present during the first part of the mixing step. The tungstate solution should not be added to the acid solution, as this would cause an excess of acidity throughout the whole time of mixing and such excess of acidity is undesirable during the earlier part of the mixing step.

3. The hydrogel into which the sol or reaction mixture sets is rather soft and must be washed carefully. It is broken into pieces and washed free from acid and salt. If the wash water is heated, this step is expedited.

4. The washed hydrogel is now carefully dried to secure the final hard, dried gel. It is first dried in a stream of air at 75° to 120° C. After this heating, the gel will still contain a considerable quantity of water, and the greater part of this is driven off by increasing the temperature slowly up to 300° to 400° C. In this manner the hydrogel is dehydrated to a water content of say 10% to 15% of the weight of the dried gel.

*Fifth example.*

As an example of the method of incorporating gel "fines" in a plural gel (that is, a gel consisting of two or more colloidal oxides), the following process of preparing a gel of silica and tungsten oxides including gel "fines" is given:

1. First sols for each oxide are prepared and the desired amount of gel "fines" is incorporated with each of these sols. Thus, a sol of silicic acid with gel "fines" therein is prepared, of such concentrations and proportions that it will set to a hydrogel which can be dried and washed to give a hard, highly porous final product. Similarly, a sol of tungstic acid with gel "fines" incorporated therein is also prepared, this sol being such that it will set to a hydrogel that can be washed and dried to give a hard, highly porous tungsten gel. The methods of preparing both of these sols have been described previously herein.

2. These two sols with the gel "fines" therein are now thoroughly mixed.

3. After a time the mixed sol will set to a hydrogel.

4. This hydrogel is broken into pieces and washed.

5. The washed hydrogel is now dried, being nearly dehydrated as by drying at a temperature of 75° to 120° C. followed by gradually raising the temperature to 200° or 300° C.

Instead of adding the gel "fines" to each sol, the sols can be intermixed and the gel "fines" added at this time.

It will be understood that this is merely an example of a method of preparing plural gels including gel "fines" as one of the ingredients.

It will be understood that the term "sol" as used in the claims is intended to include a sol for preparing a plural gel, that is, a gel of two or more oxides, as well as one capable of being treated to give a single gel, that is, a gel of a single oxide.

Having thus described the invention, what is claimed as new and desired to be secured by Letters Patent is:

1. In the method of making a hard, highly porous gel, the steps of preparing a sol that sets to a hydrogel which after washing can be dried into a hard, porous gel, and mixing gel "fines" into said sol.

2. The process of preparing a hard, highly adsorbent silica gel consisting in mixing with vigorous agitation gel "fines" and solutions of an acid and a silicate, said solutions being of such concentrations and proportions that the liquid mixture, after a time, without precipitation, sets to a hydrogel, and thereafter nearly dehydrating said hydrogel.

3. In the process of preparing a hard, highly porous silica gel, the step of mixing with vigorous stirring, gel "fines" and solutions of an acid and a silicate, the solutions being of such proportions and concentrations that after a time, without any precipitation, the whole mass sets to a hydrogel.

4. The method according to claim 1 wherein the gel "fines" are silica gel "fines".

5. The method according to claim 3 wherein the gel "fines" are silica gel "fines".

6. The process of preparing a hard, highly porous silica gel consisting in stirring gel "fines" into an acid solution, adding a waterglass solution thereto with continued vigorous agitation, the solutions being of such concentrations and proportions that after a time, the entire mass, without precipitation, sets to a hydrogel, the agitation of the mixture being continued until it begins to thicken, allowing the mixture to set to a hydrogel and then nearly dehydrating the same.

In testimony whereof we hereunto affix our signatures.

ERNEST B. MILLER.
GERALD C. CONNOLLY.